June 24, 1947.　　　C. L. RAMSEY　　　2,422,983
TOOL HOLDER
Filed Feb. 8, 1945
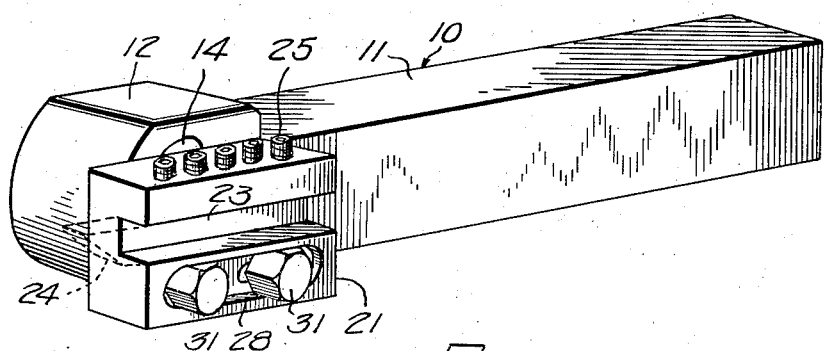
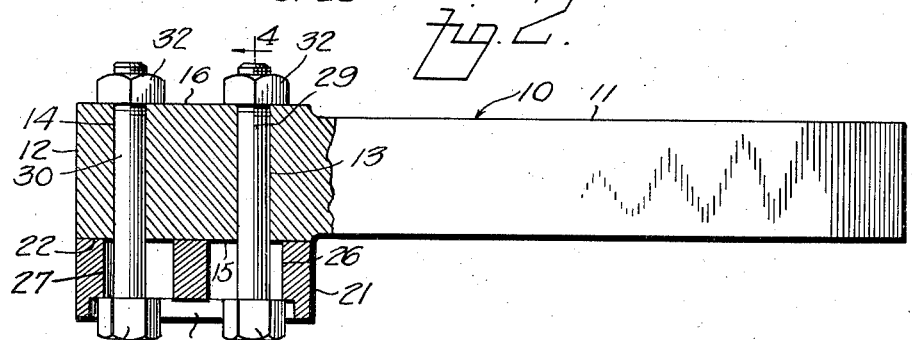
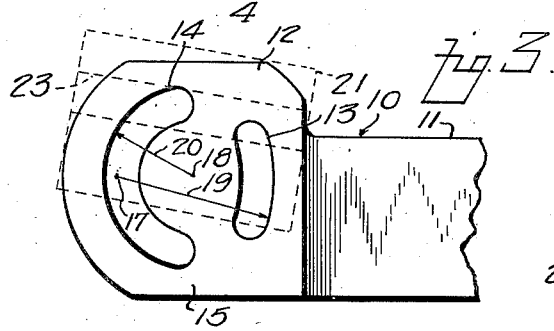
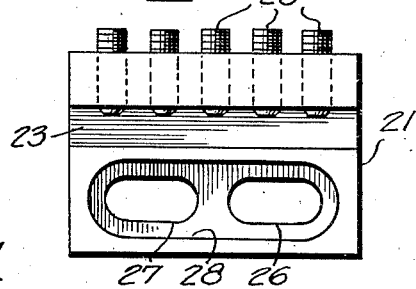
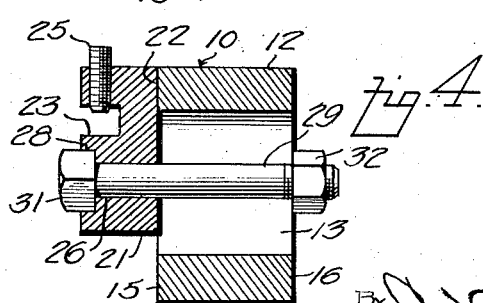
INVENTOR
C. L. RAMSEY
ATTORNEYS Patented June 24, 1947

2,422,983

UNITED STATES PATENT OFFICE 2,422,983

TOOL HOLDER

Charles L. Ramsey, Los Angeles, Calif.

Application February 8, 1945, Serial No. 576,802

6 Claims. (Cl. 29—98)

This invention relates to tool holders, and more particularly to a tool holder for metal working lathes.

Tool holders now in common use are constructed and arranged to permit vertical adjustment within a limited angle. If greater height is desired, the operator must use the trial-and-error method of inserting extra pieces of packing or shimming picked up at random. Moreover, proper adjustment of the tool ordinarily requires that its cutting edge be ground to a precise dimension.

An important object of the present invention is to provide a tool holder of novel construction which permits a variety of adjustments, each to a substantial extent, and wherein the tool bit is held rigidly in any adjusted position.

A further object is to provide a tool holder so constructed as to provide for substantial vertical adjustment and substantial adjustment toward and away from the work horizontally, while at the same time permitting substantially angular swinging of the tool, the same elements and formations of parts providing for the various substantial adjustments.

A further object is to provide a coacting tool block and tool shank head having slots therein formed in a novel manner to receive connecting bolts, the slots in one of the elements being arcuate and eccentric so as to prevent the clamping bolts from moving bodily in an arc of a circle, thus assisting in rigidly holding the elements together.

A further object is to provide such a tool wherein one of the coacting elements referred to is provided with the eccentric slots and the other with longitudinal slots through which the clamping bolts extend, the longitudinal slots allowing for bodily movement of the bolts in the arcuate slots when angular adjustment is being made, and providing for adjustment of the tool bit toward and away from the work.

A further object is to provide such a device wherein a tool block may be mounted against either side of the head of the tool shank, thus greatly facilitating cutting operations at either side of the tool shank.

Other objects and advantages of the invention will become apparent during the course of the following description.

In the drawings I have shown one embodiment of the invention. In this showing

Figure 1 is a perspective of the device assembled, a cutting tool being shown in dotted lines, Figure 2 is a horizontal sectional view through the device, a portion of the shank being shown in elevation, Figure 3 is a side elevation of the shank element as a whole, the tool block being shown in dotted lines in one adjusted position, Figure 4 is a transverse section on line 4—4 of Figure 2, and Figure 5 is a face view of the tool block.

Referring to Figure 1 the numeral 10 designates a shank element as a whole having a shank proper 11 and a head 12. The head 12 may be bodily off-set upwardly with respect to the shank 11 as shown in Figure 3 and is provided with two slots 13 and 14 projecting entirely therethrough from side to side. The head 12 is preferably slightly thicker than the shank 11 (Figure 2) and has opposite flat machined faces 15 and 16.

The slots 13 and 14 are formed about horizontal axes which are off-set from each other. For example, the axis of the slot 13 may lie at the point 17 while the axis of the slot 14 lies at the point 18. The lines 19 and 20 in Figure 3 respectively represent radii of the curvatures of the slots 13 and 14.

A tool block 21 has one vertical flat face 22 adapted to seat against either of the faces 15 or 16, and usually against the face 15 as shown in the drawing. The tool block is provided with a tool-receiving groove 23 in which may be arranged the desired tool shown in dotted lines in Figure 1 and indicated by the numeral 24. The groove 23 corresponds in cross-sectional shape and size to the tool 24, as will be apparent. A series of Allen socket set screws 25 are threaded in the block 21 and have their lower ends arranged to engage and grip the tool 24 to rigidly fix it in position in the slot 23. The tool may be of any desired type according to the work to be performed, as will be apparent.

The tool block is provided with a pair of elongated horizontal slots 26 and 27. At one end these slots extend through the face 22, and at their other ends these slots terminate within an elongated recess 28. Bolts 29 and 30 extend through the slots 26 and 13 and the slots 27 and 14, respectively. Each of these bolts is provided with a head 31 and when the device is assembled the bolt heads 31 have opposite faces engaged against the top and bottom of the recess 28 to prevent the bolts from turning while the nuts 32 of the bolts are tightened.

The operation of the device is as follows:

The proper tool 24 is inserted in the slot 23, whereupon the set screws 25 are tightened to clamp the tool in position. The tool may be adjusted with respect to the work as desired by loosening the nuts 32 and adjusting the tool block 21 relative to the head 12. It will be apparent that the block 21 may be turned in a vertical plane without being raised, lowered, or moved toward or away from the work. Such turning movement of the block 21 takes place with the bolts 29 and 30 sliding in the respective slots 13 and 14. This movement of the bolts in the slots causes the bolts to move relatively toward or away from each other due to the eccentricity of the slots 13 and 14. Movement of the bolts toward and away from each other is permitted because of the elongation of the slots 26 and 27.

It also will be apparent that the block 21 may be moved horizontally toward or away from the work without being turned in a vertical plane or being moved vertically. Under such conditions the bolts 29 and 30 remain stationary while the block 21 moves relative to the bolts. This operation also is permitted because of the elongation of the slots 26 and 27. It also will be apparent that without being turned in a vertical plane or being moved toward or away from the work, the block 21 may be directly vertically moved. Upon such vertical movement of the block the bolts 29 and 30 will move in their slots 13 and 14 lengthwise with respect to such slots. At the same time the distance between the bolts will change as they move in the slots 13 and 14, such movement being permitted by the elongation of the slots 26 and 27.

From the foregoing it will be apparent that the block 21 may be moved horizontally or vertically, or may be turned angularly in a vertical plane. Considering the foregoing operations it likewise will be apparent that any two of these adjustments can take place simultaneously, or all three of them may take place at the same time in order to provide the desired adjustment. For example, assuming that the bolts 29 and 30 are near the bottoms of the slots 13 and 14 and near the inner ends of the slots 26 and 27 with the block 21 arranged horizontally, it may be desired to angle the tool, move it toward the work and elevate it. Upon the loosening of the nuts 33 these three movements may be simultaneously performed to place the cutting bit accurately in the desired position.

Thus the present device, while extremely simple in construction, permits every desired adjustment of the tool bit. The eccentricity of the slots 13 and 14 is highly desirable since it prevents the block 21 from being turned on a single horizontal axis due to the application of force to the tool bit. Such tendency for the block 21 to turn will cause the bolts to bind in the slots 13 and 14. The curvature of the latter slots also permits a greater range of angular adjustments of the tool, as will be apparent. It also will be apparent that the block 21 may be moved and placed on the other side of the head 12 if desired. In such case the nuts 32 will be removed and the head 21 withdrawn from the side of the head 12 to which it has been attached, whereupon the block 21 may be placed in position at the opposite side of the head 12 with the face 22 seated against the face 16. The present device is very simple in construction and easily operated to secure a wide range of adjustments. At the same time the device eliminates the trial-and-error method of adjustment, the use of shims and the like and the grinding of the tool bits in order to secure the proper adjustment.

It is to be understood that the form of the invention herein shown and described is to be taken as a preferred example of the same and that various changes in the shape, size and arrangement of parts may be resorted to without departing from the spirit of the invention or the scope of the subjoined claims.

I claim:

1. A tool holder comprising a pair of elements adapted to be arranged against each other, one of said elements being provided with a pair of arcuate slots and the other element being provided with a pair of aligned slots, one of said elements provided with means for securing a tool thereto, and a bolt extending through each of said aligned slots and through one of said arcuate slots to clamp said elements together.

2. A tool holder comprising a pair of elements adapted to be arranged against each other, one of said elements being provided with a pair of arcuate slots and the other element being provided with a pair of aligned slots, said arcuate slots being formed eccentric to each other, one of said elements being provided with means for securing a tool thereto, and a bolt extending through each of said aligned slots and through one of said arcuate slots to clamp said elements together.

3. A tool holder comprising a pair of elements having opposite vertical flat faces, and the other of which is a block having a vertical flat face engageable against one of said faces of said head, the opposite face of said block being recessed to receive a tool, one of said elements having a pair of arcuate slots extending generally vertically and the other element being slotted generally horizontally, and a pair of bolts extending through said slotted head and each extending through one of said arcuate slots to clamp said elements together.

4. A tool holder comprising a pair of elements, one of which is a head having opposite vertical flat faces, and the other of which is a block having a vertical flat face engageable against one of said faces of said head, the opposite face of said block being recessed to receive a tool, one of said elements having a pair of arcuate slots extending generally vertically eccentric to each other with their upper and lower ends curving toward each other, the other element being slotted generally horizontally, and a pair of bolts extending through said slotted head and each extending through one of said arcuate slots to clamp said elements together.

5. A tool holder comprising a head having a vertical face and provided with generally vertically arranged arcuate slots extending therethrough from side to side, a block having a flat vertical face engageable against said face of said head, and a bolt extending through each arcuate slot, said block being slotted generally horizontally for the passage of said bolts through said block whereby said block and said head may be clamped together, said block having means for securing a tool thereto.

6. A tool holder comprising a head having a vertical face and provided with generally vertically arranged arcuate slots extending therethrough from side to side, said slots being eccentric to each other with their ends curving toward each other, a block having a flat vertical face engageable against said face of said head, and a bolt extending through each arcuate slot, said block being slotted generally horizontally for the passage of said bolts through said block whereby said block and said head may be clamped together, said block having means for securing a tool thereto.

CHARLES L. RAMSEY.

REFERENCES CITED

The following references are of record in the file of this patent:

UNITED STATES PATENTS

| Number | Name | Date |
|---|---|---|
| 707,472 | Welter & Armstrong | Aug. 19, 1902 |
| 1,739,501 | Cardullo et al. | Dec. 17, 1929 |
| 1,931,730 | Klay | Oct. 24, 1933 |

FOREIGN PATENTS

| Number | Country | Date |
|---|---|---|
| 41,852 | France | May 1, 1933 |